(12) United States Patent
Mobley et al.

(10) Patent No.: US 6,848,019 B1
(45) Date of Patent: Jan. 25, 2005

(54) PERFORMANCE IN A DATA STORAGE DEVICE USING HEAD-TO-HEAD OFFSETS IN ACCESS COMMAND SCHEDULING

(75) Inventors: Jack A. Mobley, Oklahoma City, OK (US); Jason D. Gregg, Oklahoma City, OK (US); Kenny T. Coker, Mustang, OK (US); Leonard D. Doss, Oklahoma City, OK (US)

(73) Assignee: Seagate Technology LLC, Scotts Valley, CA (US)

( * ) Notice: Subject to any disclaimer, the term of this patent is extended or adjusted under 35 U.S.C. 154(b) by 527 days.

(21) Appl. No.: 09/696,269

(22) Filed: Oct. 24, 2000

Related U.S. Application Data

(60) Provisional application No. 60/183,102, filed on Feb. 17, 2000.

(51) Int. Cl.$^7$ .............................................. G06F 12/00
(52) U.S. Cl. ..................................... 711/111; 360/78.01
(58) Field of Search ............................ 711/4, 100, 111, 711/112, 167; 710/5; 360/78.04, 78.06, 78.07, 48, 75, 78.11, 78.14, 78.01; 369/275.3, 77.08

(56) References Cited

U.S. PATENT DOCUMENTS

| | | | |
|---|---|---|---|
| 5,475,545 A | 12/1995 | Hampshire et al. | |
| 5,476,015 A | 12/1995 | Valent | |
| 5,570,332 A | 10/1996 | Heath et al. | |
| 5,729,718 A * | 3/1998 | Au | 711/167 |
| 5,854,941 A * | 12/1998 | Ballard et al. | 710/5 |
| 5,859,742 A | 1/1999 | Takaishi | |
| 5,912,782 A * | 6/1999 | Lee et al. | 360/78.09 |
| 5,917,672 A | 6/1999 | Pham et al. | |
| 5,956,201 A | 9/1999 | Pham et al. | |
| 5,969,895 A | 10/1999 | Ueda et al. | |
| 6,031,684 A | 2/2000 | Gregg | |
| 6,034,837 A | 3/2000 | Purkett | |
| 6,195,222 B1 * | 2/2001 | Heminger et al. | 360/78.07 |
| 6,249,508 B1 * | 6/2001 | Senshu | 369/275.3 |
| 6,279,108 B1 * | 8/2001 | Squires et al. | 711/171 |
| 6,504,670 B1 * | 1/2003 | Dittmar | 360/78.07 |
| 6,574,676 B1 * | 6/2003 | Megiddo | 711/111 |
| 6,604,178 B1 * | 8/2003 | Hall | 711/167 |
| 6,775,090 B2 * | 8/2004 | DuLaney et al. | 360/77.02 |

* cited by examiner

*Primary Examiner*—Pierre-Michel Bataille
(74) *Attorney, Agent, or Firm*—Fellers, Snider, et al.

(57) ABSTRACT

Apparatus and method for improving disc drive performance by compensating for head-to-head offsets when scheduling a plurality of pending access commands. A disc drive includes a plurality of recording surfaces on which a plurality of concentric data tracks are defined. A servo circuit performs seeks to move a plurality of heads from an initial track to a destination track. A positional offset between each of the plurality of heads is measured and applied to an estimated seek length to calculate a corrected seek length. A corrected seek time is calculated from a seek profile table in relation to corrected seek length. The corrected seek time is used by a control processor to schedule the access commands stored in the memory.

18 Claims, 6 Drawing Sheets

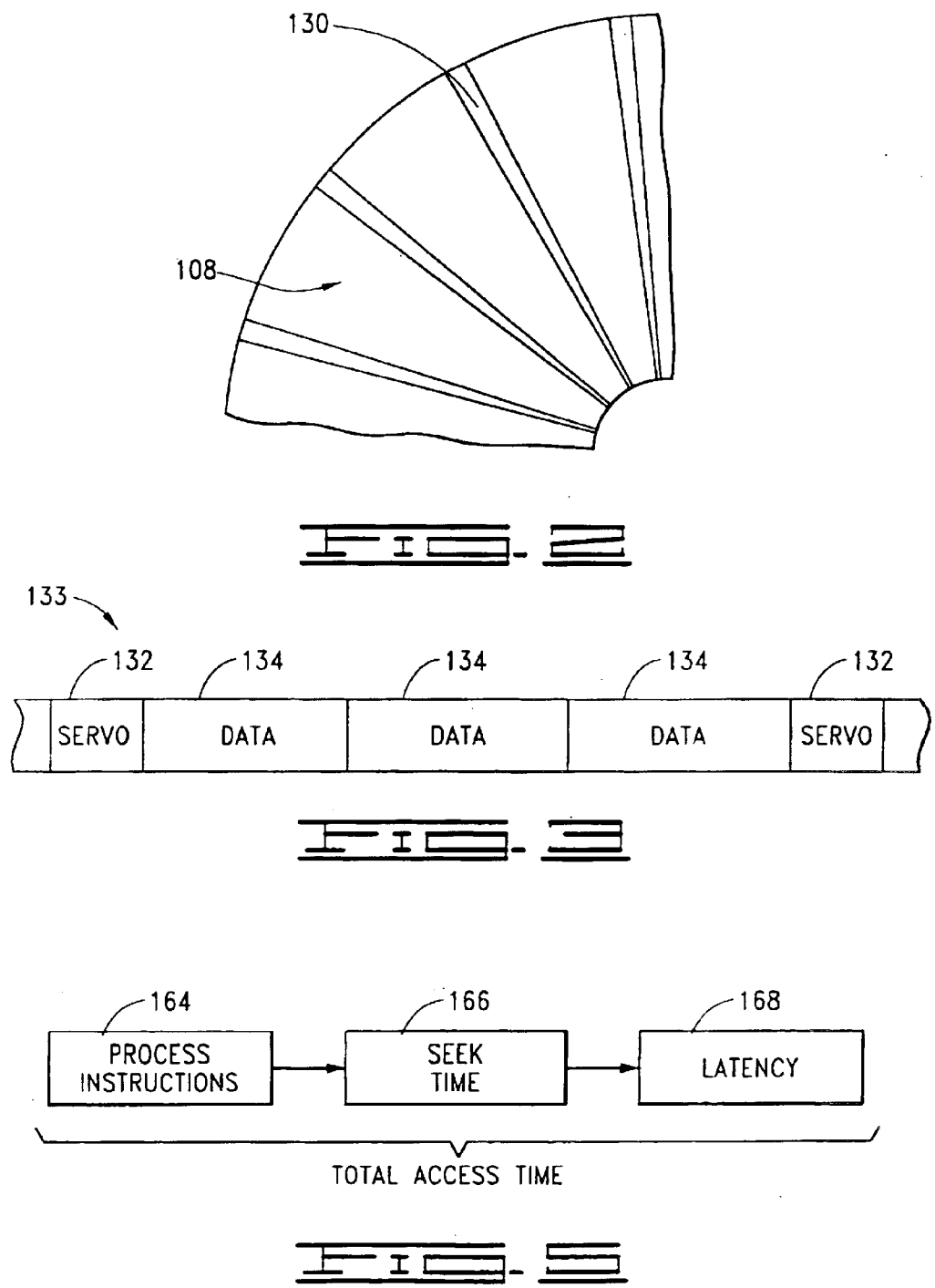

PERFORMANCE IN A DATA STORAGE DEVICE USING HEAD-TO-HEAD OFFSETS IN ACCESS COMMAND SCHEDULING

RELATED APPLICATIONS

This application claims priority to Provisional Application No. 60/183,102 filed Feb. 17, 2000.

FIELD THE INVENTION

This invention relates generally to the field of magnetic data storage devices, and more particularly, but not by way of limitation, to improving disc drive operational performance by adaptively adjusting estimated seek times to account for head-to-head offsets to improve the sorting and execution of queued access commands in a command queue of a disc drive.

BACKGROUND

Disc drives are used as primary data storage devices in modern computer systems. A typical disc drive includes one or more axially aligned discs that are rotated at a high speed by a spindle motor. Each disc surface has a plurality of concentric tracks defined by servo data written to the discs during manufacturing. Each track includes a plurality of user data fields, or sectors, to which user data are written and from which user data are subsequently read by the heads. All of the tracks on each of the disc surfaces at a given radius collectively make up a cylinder.

A corresponding array of read/write transducing heads are supported adjacent the discs and used to transfer data between the discs and a host computer in which the disc drive is mounted. It is desirable to vertically align the heads such that each head is adjacent the same cylinder at all times; nevertheless, some positional offset will typically exists between each of the heads. The heads are supported by a rotary actuator assembly which controllably moves the heads across the disc surfaces in response to a servo control system. Individual sectors are accessed for read and write operations in response to commands from the host computer.

A disc drive is further provided with host interface electronics that conform to a selected industry standard protocol to facilitate communication and data transfer between the disc drive and the host computer. Such protocols can allow the host computer to send multiple access commands to the drive at a time, and the commands are stored in a memory location (also referred to as a "command queue") pending execution by the drive. For example, disc drives using the Small Computer System Interface (SCSI) protocol can typically store up to 64 pending commands in the command queue.

When multiple commands are available for execution, the disc drive is typically configured to employ a sorting strategy to execute the commands in an order that minimizes the time necessary to access the associated sectors. A particularly useful command queue sorting strategy is disclosed by U.S. Pat. No. 5,570,332 issued to Heath et al., assigned to the assignee of the present application.

In order for the host interface electronics to determine an optimal order of execution of the pending commands, a valid estimate of time to access each of the associated sectors is needed. As will be recognized, the total access time for a drive to access a desired sector on a selected disc surface includes a (relatively short) overhead time to process the access command, a seek time during which a seek operation is performed to move the actuator from an initial cylinder to a destination cylinder so that the appropriate head is settled onto the destination track containing the desired sector, and a rotational latency time during which the drive waits for the disc to rotate the desired sector around to a position under the selected head.

To enable accurate sorting of pending access commands, disc drives typically maintain a seek profile table of values indicative of average seek time for each seek length. It is common to maintain this table as a running average so that the table is updated as each successive seek is executed. A default seek profile table, which may be generated and permanently saved to the drive in a manufacturing process, may be loaded during power-on initialization and before normal operation is entered.

For reference, a typical overhead time is usually on the order of a few microseconds, $\mu$sec ($10^{-6}$ seconds). A typical seek time will vary widely depending upon the length of the seek (i.e., whether the head is only moved a few tracks or across substantially the entire radius of the disc), but will typically range from 1–2 milliseconds, msec ($10^{-3}$ seconds) for a short seek and up to about $10^{-12}$ msec for a long seek. Latency is a function of both rotational speed of the discs as well as the angular position of the desired sector with respect to the head. For a spindle motor rotational speed of about 10,000 revolutions per minute (rpm), one disc revolution will take about 6 msec; hence, latency can vary from almost no time at all to a full 6 msec. Of course, using different rotational speeds results in different full latency times. It will be noted that, except for the case of relatively long seeks, latency is generally the largest contributing factor to total access time.

The evaluation of a particular access command for execution at any given time must take into account not only how far away the destination track is located, but also the angular position of the destination sector with respect to the head. If the disc drive cannot reach the destination track before the destination sector "passes" the head, then an entire revolution of the disc (a full rotational latency period) will have to occur before the head can access the desired sector. This is sometimes referred to as a "burned" revolution, and is highly undesirable since burned revolutions reduce the overall data transfer rate sustained by the disc drive.

A disc drive is typically in a track-following mode of operation when evaluating the access commands in the command queue, so that a selected one of the heads is actively maintained over a corresponding track on the associated disc surface (usually the last accessed track by the disc drive). The pending access commands in the command queue, however, may be associated with destination sectors on disc surfaces other than the one over which the presently active head is located. Thus, when evaluating each of the pending access commands in the command queue, the disc drive typically determines the distance to the target track by determining the number of tracks between the track being followed by the presently active head and the destination cylinder containing the target track, which assumes that all of the heads are nominally aligned.

As track densities continue to increase, the amount of inter-head radial spacing becomes increasingly significant and detracts from the ability of the drive to accurately determine the actual distance to the target track. For example, if the destination cylinder is 30 tracks away from the presently selected head, and the target head is offset from the presently selected head a distance of two tracks in the opposite direction, then the actual seek distance required to place the target head over the target track is 32 tracks, not 30.

However, the controller will schedule the access command based on a 30 track seek, leaving open the possibility that the target head will not reach the target track within the expected time (and require a burned revolution).

Accordingly, there is a continued need to develop an efficient method whereby head offsets are taken into consideration when performing combined seek/head switch operations to provide better estimates of actual seek time when sorting pending access commands.

SUMMARY OF THE INVENTION

The present invention provides an apparatus and method for improving disc drive data transfer rate performance.

In accordance with preferred embodiments, a disc drive includes a plurality of recording surfaces on which a plurality of concentric data tracks are respectively defined. A servo circuit performs seeks to move a plurality of heads from an initial track to a destination track. A control processor schedules a plurality of pending access commands stored in a command queue.

For each pending access command that requires a head switch from a presently active head to another target head, an estimated seek length is calculated as the radial distance between the destination cylinder in which the destination track is located and the initial cylinder over which the presently active head is located. A positional offset between each of the plurality of heads is measured and applied to the estimated seek length to calculate a corrected seek distance indicative of the actual distance between the target head and the destination track. A corrected seek time is calculated from a seek profile table in relation to the corrected seek distance. The corrected seek time is used by the control processor to schedule the access commands stored in the command queue.

These and other features and advantages which characterize the present invention will be apparent from a reading of the following detailed description and a review of the associated drawings.

BRIEF DESCRIPTION OF THE DRAWINGS

FIG. 2 illustrates the manner in which servo data are stored on the discs of the disc drive of FIG. 1.

FIG. 3 shows the relative relationship between servo fields and user data fields (sectors) on a selected track on the disc of FIG. 2.

FIG. 5 illustrates the separate elements that comprise a total access time associated with accessing a selected sector on the disc of FIG. 2.

DETAILED DESCRIPTION

Figure 1:
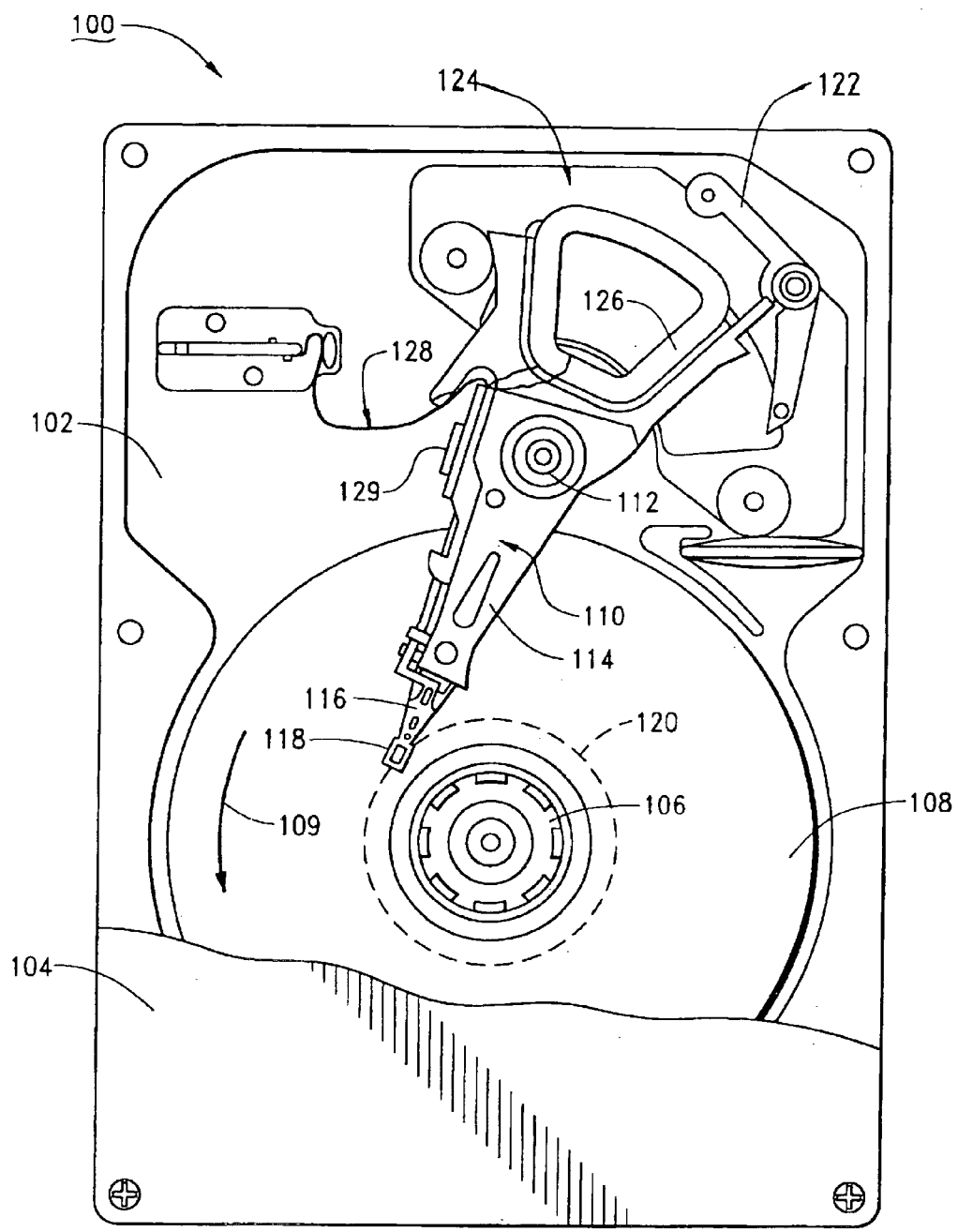
FIG. 1 is a top plan view of a disc drive constructed in accordance with preferred embodiments of the present invention.

In order to provide a detailed description of various preferred embodiments of the present invention, reference is first made to FIG. 1, which provides a top plan view of a disc drive 100 of the type used to interface with a host computer to magnetically store and retrieve user data. The disc drive 100 includes a base deck 102 to which various components of the disc drive 100 are mounted. A top cover 104 (shown in partial cutaway fashion) cooperates with the base deck 102 to form an internal, sealed environment for the disc drive.

A spindle motor (shown generally at 106) is provided to rotate a plurality of axially-aligned, rigid, magnetic recording discs 108 at a constant speed in rotational direction 109. User data are written to and read from tracks (not designated) on the discs 108 through the use of an actuator assembly 110, which rotates about a bearing shaft assembly 112 positioned adjacent the discs 108.

The actuator assembly 110 includes a plurality of rigid actuator arms 114 which extend toward the discs 108. A plurality of flexible suspension assemblies 116 (flexures) are attached to the distal end of the actuator arms 114. A head 118 is mounted at the distal end of each of the flexures 116 and includes a slider assembly (not separately designated) designed to fly in close proximity to the corresponding surface of the associated disc 108. When the disc drive 100 is deactivated, the heads 118 come to rest on texturized landing zones 120 and the actuator assembly 110 is secured using a magnetic latch 122.

The actuator assembly 110 is rotated using a voice coil motor (VCM) 124, which includes an actuator coil 126. A flex circuit assembly 128 provides electrical communication paths between the actuator assembly 110 and a disc drive printed circuit board assembly (PCBA) mounted to the underside of the base deck 102. The flex circuit assembly 128 includes a preamplifier/driver circuit 129 ("preamp") which applies currents to the heads 118 to read and write data.

FIGS. 2 and 3 generally illustrate the manner in which servo data are stored on the disc surfaces, the servo data enabling servo control circuitry on the PCBA to detect head position and velocity in order to position the actuator in a desired relation to the discs. The servo data are written using a servo track write (STW) process during disc drive manufacturing and are arranged in a plurality of radially extending servo wedges 130. Each wedge 130 comprises a plurality of adjacent servo fields 132 which are radially aligned to define each of the tracks on the disc surface (a portion of one such track is represented at 133 in FIG. 3).

User data fields 134 (also "data sectors" or "sectors") are defined between adjacent servo fields 132 during a disc drive formatting operation. It will be recognized that the data sectors 134 are typically much longer than the servo fields 132 in order to maximize data capacity, so that the aspect ratios and relative lengths of the fields in FIG. 3 are not represented to scale.

Figure 4:
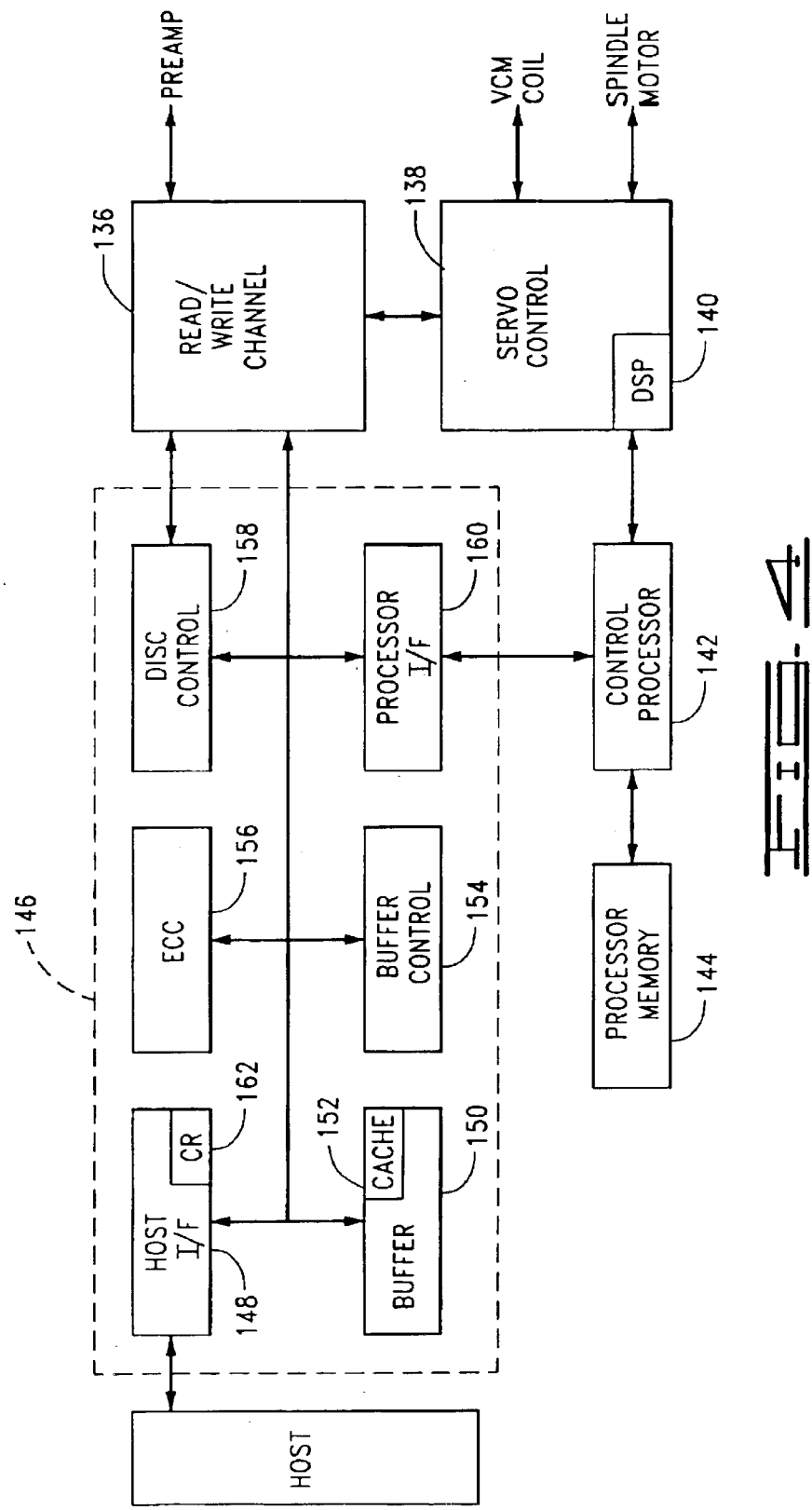
FIG. 4 is a generalized functional block diagram of the disc drive of FIG. 1.

FIG. 4 provides a functional block diagram of relevant portions of the control circuitry supported on the disc drive PCBA, including a read/write channel 136, a servo control circuit 138 with programmable digital signal processor (DSP) 140, top level control processor 142 with associated memory 144, and interface control electronics 146.

The read/write channel 136 operates as a communication channel to encode input data to be written to the discs 108 and to decode amplified readback signals from the preamp 129 to reconstruct data retrieved from the discs 108.

The servo control circuit 138 operates to demodulate head position and velocity from the servo data from the servo fields 132 (FIG. 3) and applies currents to the coil 126 to rotate the actuator assembly 110 accordingly. The servo control circuit 138 further provides drive currents to the spindle motor 106 to rotate the discs 108 at operational speed during drive operation. For purposes of the present discussion, it will be contemplated that the servo control circuit 138 rotates the spindle motor 106 at a nominal operational speed of 10,000 revolutions per minute (rpm).

The control processor 142 provides top level control for the disc drive 100 in accordance with programming steps stored in processor memory 144 and host commands provided by a host computer (not shown).

The interface electronics 146 includes a host interface (I/F) circuit 148 which controls the transfer of data and commands between the disc drive 100 and the host. A buffer 150 (with cache memory 152) temporarily stores data that are being transferred between the host and the discs 108. More particularly, during a write operation the host loads the buffer 150 with data to be written to the discs 108, and the loaded data are sequentially passed to the read/write channel 136 for processing. During a read operation, the read/write channel 136 sequentially loads the buffer 150 with data retrieved from the discs 108 for subsequent transfer to the host. A buffer control circuit 154 controls the flow of data in and out of the buffer 150.

An error correction circuit (ECC) 156 applies on-the-fly error detection and correction algorithms to the retrieved data to correct detected errors in the retrieved data in the buffer 150. A disc control circuit 158 sequences the read and write operations by the read/write channel 136. A processor interface (I/F) 160 provides a communication path with the control processor 142.

For purposes of the present discussion, it will be contemplated that the interface electronics 146 uses the Small Computer System Interface (SCSI) host interface protocol, although such is not limiting to the scope of the invention as claimed below. Hence, the host I/F 148 includes a memory location, CR (command queue) 162 that can concurrently store up to 64 pending access commands from the host. One type of access command is a write command from the host to write a block of data loaded into the buffer 150 by the host to a selected sector 134 (FIG. 3) on a selected disc surface; another type of access command is a read command from the host to retrieve the contents of a selected sector 134 (FIG. 3) on a selected disc surface to the buffer 150 for subsequent transfer to the host. It will be noted that the host employs logical block addresses (LBAs) to identify the desired sectors 134, and the control processor 142 converts each LBA to a physical block address (PBA) to identify the cylinder, disc surface and angular location of the desired sector.

When multiple access commands are pending in the command queue 162, the control processor 142 applies a sorting strategy designed to maximize data transfer rate performance. This strategy includes the evaluation of the total access time required to access each of the associated data sectors 134 referenced by the pending commands. As illustrated by FIG. 5, the total access time (also referred to as "phase") includes a relatively short overhead period (block 164) to process the instructions and prepare the disc drive for execution, a seek time (block 166) necessary to bring the associated head 118 over the track 133 containing the desired sector 134, and then latency time (block 168) necessary to allow the desired sector 134 to rotate around and reach the head 118.

Each seek operation of block 166 generally includes steps of applying current to the coil 126 to initially accelerate the head 118 in the desired direction, subsequently applying current to the coil 126 in the opposite direction to decelerate the head 118 to a position adjacent the destination track, and then applying additional control inputs as necessary to settle the head 118 onto the destination track within acceptable limits (as a percentage of off-track width away from the center of the track).

Relatively longer seeks are typically carried out using a velocity controlled approach, in which current is applied to cause the head 118 to follow a predetermined velocity profile to move from the initial track to the destination track. Shorter seeks can be carried out using a model reference seek, wherein a sinusoidal reference current profile is applied, such as a 1-cos curve, to provide a reference velocity which the head 118 follows to the destination track. Both velocity controlled seeks and model reference seeks are known in the art, and are respectively discussed in U.S. Pat. No. 5,475,545 issued to Hampshire et al. and U.S. Pat. No. 6,031,684 issued to Gregg et al.

As previously mentioned, when multiple access commands are pending in the command queue 162 of FIG. 4, a sorting strategy is employed to carry out the pending commands in an order that maximizes data transfer rate. Irrespective of the particular sorting strategy employed, it is necessary for the control processor 142 to have an accurate indication of the expected seek time (block 166) for each seek length necessary to reach the sectors 134 associated with the command queue. If the actual time necessary to complete the seek is longer than expected, the head may not reach the destination track in time, requiring the drive to burn a full revolution before the desired sector 134 comes around again for access by the head 118. The greater the seek time variation, the more likely that burned revolutions will occur and overall sustained transfer rate will be decreased.

As will be recognized, the amount of seek time variation for a population of seeks of any given length depends on a variety of factors. One such factor is the particular control methodology employed to carry out the seek. Depending upon the configuration of the drive and length of the seek, model reference seeks have been found to provide average seek times of from less than 1 msec to about 3 msec, with upwards of 2 msec of seek time variation for a given seek length. Velocity controlled seeks have been found to provide average seek times of from about 3 msec (for short seeks) to about 12 msec or more (for full stroke seeks), with upwards of about 1 msec of seek time variation for a given seek length.

Another factor that introduces seek time variation is settling performance, which in turn can be influenced by mechanical resonance characteristics of the actuator assembly 110, as well as the various electrical parameter values (gain, etc.) selected for use during the seek (that is, how well the drive is "tuned" for the particular seek length). As discussed above, a seek is not completed until the head 118 is sufficiently on-track for a sufficient period of time to ensure that the access operation can be carried out successfully. This is sometimes referred to as "on-track qualification."

To achieve on-track qualification, the servo control circuit 138 will typically require that the head 118 read a selected number of successive servo fields 132 on the destination track and determine that the head 118 is within the acceptable off-track limits for each of the servo fields. Typical requirements can be the detection of three successive servo fields 132 with the head 118 within ±20% of track center for a read operation, and five successive servo fields 132 with the head 118 within ±15% of track center for a write operation. The more stringent requirements for a write operation are typically employed due to the fact that the magnetic characteristics of the discs 108 are altered during a write operation, and it is important to not inadvertently overwrite existing data on an adjacent track. It follows that drives that have different on-track qualification requirements for read and write operations can have different average seek times for the same length seek, depending upon whether the access operation is a read or write operation. In such case, the drives can either maintain separate read and write seek tables, or elect to use the values for the longer seek type (which will typically be the write seek). It will be noted that the present invention can be readily configured to use different seek times based on access operation type.

Figure 6:
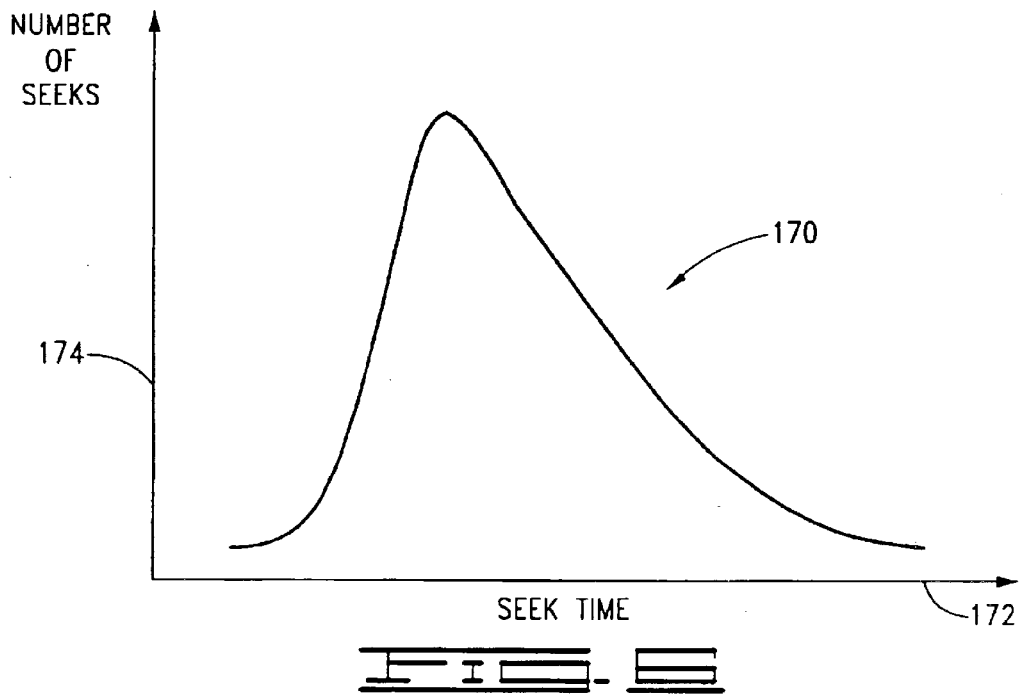
FIG. 6 illustrates seek time variation for a population of seeks of a given seek length distance, in which the seek time variation is reasonably well controlled.
Figure 7:
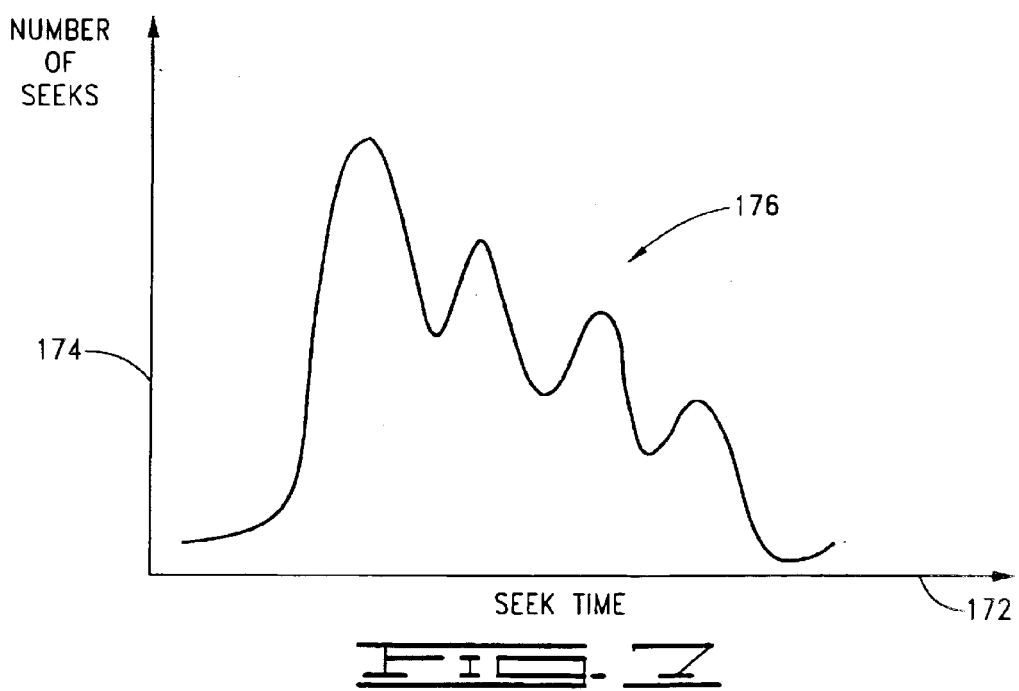
FIG. 7 illustrates seek time variation for another population of seeks of a different seek length distance, in which the seek time variation is less well controlled.

Because of this qualification requirement, poor settling performance can introduce significant amounts of seek time variation, as contrasted by FIGS. 6 and 7. A population of seeks for a given seek length with reasonably well behaved settling characteristics will typically provide a well defined accumulated population curve, such as represented at 170 in FIG. 6. The population curve 170, plotted against an x-axis 172 indicative of total seek time and a y-axis 174 indicative of number of seeks, represents a statistically significant number of seeks of identical length. It will be noted that the curve 170 is unimodal and skewed to the left (asymmetric).

By contrast, FIG. 7 illustrates a population of seeks (curve 176) for a given seek length with relatively poor settling characteristics. The response is multimodal, indicative of excessive oscillation of the head 118 upon reaching the destination track. The subsequent modes, or peaks, in the curve 176 generally arise due to the additional number of servo fields 132 necessary for qualification. That is, depending upon the extent of the oscillation of the head 118 when the destination track is reached, additional servo fields 132 may have to be read before servo qualification is obtained, undesirably extending the overall seek lime.

Figure 8:
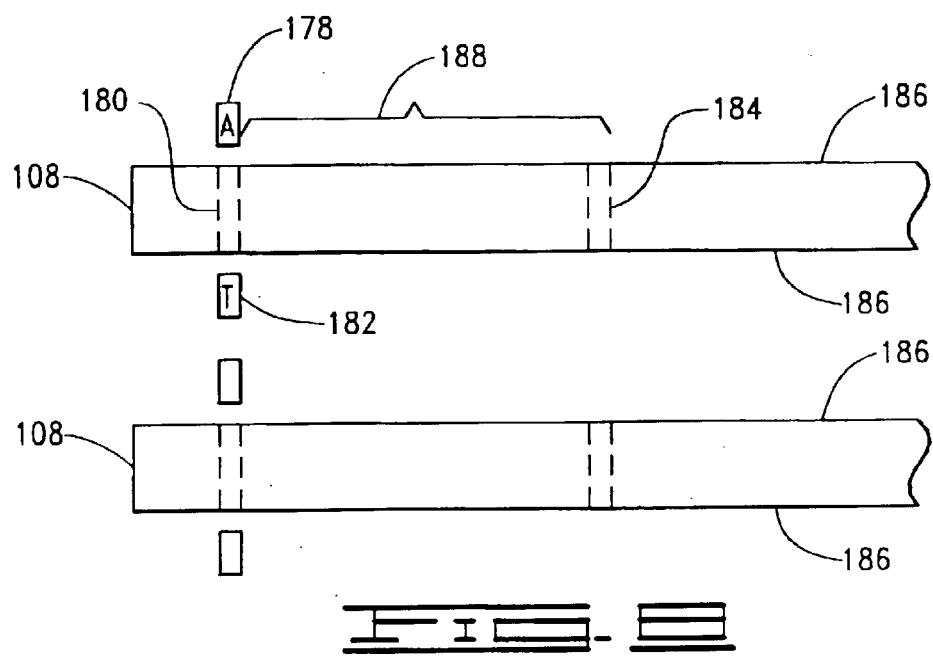
FIG. 8 illustrates the relative position of heads and seek distances for heads exhibiting no positional offset.
Figure 9:
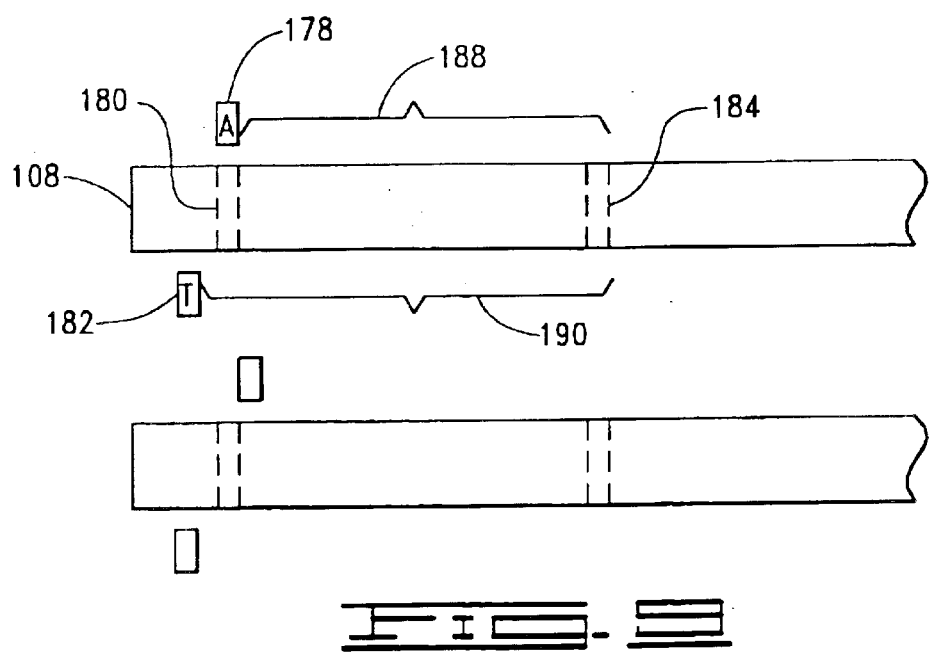
FIG. 9 illustrates the relative position of heads and seek distances for heads exhibiting positional offset.

Turning now to FIGS. 8 and 9, provided therein is a graphical representation of the effects of head offset on a seek operation to move and switch from a presently active head 178 adjacent an initial cylinder 180 to a different, target head 182 over a destination track in a destination cylinder 184. As shown, the two discs 108 each include two recording surfaces 186, however it will be understood that additional configurations for the disc drive 100 are encompassed by the present invention.

Referring to FIG. 8, at the onset of a seek operation, the servo control circuit 138 calculates the estimated seek length 188 as the radial distance (in "tracks to go") between the position of the presently active head 178 over the initial cylinder 180 and the destination cylinder 184. The servo control circuit 138 then applies current to the VCM 124 in relation to the estimated seek length 188 to move the presently active head 178 from the initial cylinder 180 to the destination cylinder 184. Upon settling over the destination cylinder 184, the preamp 129 performs a head switch operation to switch to the target head 182 in order to perform the read/write operation.

As shown in FIG. 8, each of the heads 118 are vertically aligned with one another over the initial cylinder 180. As such, at the close of the seek operation, each of the heads 118 will be located adjacent the destination cylinder 184. When switched active, the target head 182 will be properly positioned over the destination cylinder, thus eliminating the need for a second seek to place the target head 182 above the destination cylinder 184.

However, as track densities continue to increase, it becomes less likely that a plurality of heads 118 will be vertically aligned over any given cylinder on the discs 108. With reference to FIG. 9, the heads 118 are shown exhibiting various degrees of radial offset from the presently active head 178 located above the initial cylinder 180.

As described above, the seek operation begins by calculating the estimated seek length 188 based on the radial distance between the initial cylinder 180 over which the presently active head 178 is located and the destination cylinder 184. Due to the radial offset between heads 178 and 182, the actual distance between the target head 182 and the destination cylinder 184, shown by an actual seek length 190, is larger than the estimated seek length 188. When the seek operation is performed in relation to the estimated seek length 188, the target head 182 may "undershoot" the destination cylinder 184 by an amount equivalent to the radial offset exhibited between the presently active head 178 and the target head 182. When switched active, a second seek operation will be required to settle the target head 182 onto the destination cylinder 184, thus increasing the seek and total access times.

In a queued environment, increased emphasis is placed on seek time estimation. As mentioned above, a seek profile table is used to estimate the time associated with each pending access command in the command queue 162. Commonly, these pending access commands are prioritized based on how closely the estimated seek time coincides with the amount of latency expected between read/write operations. In other words, the most time intensive access commands are executed when a larger degree of latency is experienced between read/write operations. Likewise, seek operations requiring smaller total access times are executed when smaller latency times are expected. Ideally, the seek operation would place and qualify the target head 182 over the destination cylinder just before the target data sector 134 passes beneath the target head 182.

Because the average seek times used to sort the command queue are based on seek length, an incorrect estimated seek length will propagate a degree of error into the estimation of seek time. Consequently, the faulty estimation of seek times adversely impacts the operation of the command queue 162 and may result in excessive total access times, due to the need for burned revolutions.

To compensate for head offset when estimating seek times, presently preferred embodiments of the present invention employ a head offset table. The elements of this table are a representation of the offset, in tracks, from one head to another. Preferably, the table is updated every time the servo control circuit 138 is commanded to perform a seek which results in a sequential head switch (a head switch from a head to either of its adjacent heads). The head offset table is preferably stored within the processor memory 144. However, it will be understood that the head offset table may be stored in alternative locations, such as, for example, in memory within the servo control circuit 138. The logical form of the head offset table with typical values of offsets is presented below in TABLE 1.

TABLE 1

Head Offset Table

| HEAD | OFFSET FROM PREVIOUS HEAD IN TABLE (IN TRACKS) |
|---|---|
| 0 | −5.50 |
| 1 | 1.25 |
| 2 | 2.5 |
| 3 | 0.95 |

Table 1—Head Offset Table

The above table is an example of the formatting preferred for the head offset table for use in a disc drive employing four heads 118. It will be understood that other representations, including greater or lesser numbers of heads, are considered within the scope of the present invention.

To use this table to resolve the offsets from any head, H1, to a second head, H2, the following methodology is used: if H1 is less than H2 then the offsets in the table are summed from H1+1 to H2. If H1 is greater than H2, then the offsets are summed from H1+1 to the last numbered head in the table and added to the summation of the offsets from the first head in the table to H2. Applying this to the values provided in the sample table, the offset exhibited in a switch from head 0 to head 3 is 4.7 tracks; the offset experienced in a switch from head 3 to head 2 is −1.75 tracks.

The initial offset values for the head offset table are preferably determined during operation. The head offset values may be calculated during idle time, after a predetermined elapsed period of time or after a measured operational event, such as, for example, at such time as the disc drive reaches a steady-state operational temperature.

To measure head offset, the disc drive 100 is placed in track following mode on a first head. The disc drive is then switched to a second head for a length of time sufficient to read a cylinder number and a position error signal (PES). While reading the cylinder and PES, the control signal is held constant, that is, no attempt is made to correct the position of the second head. The PES is recorded and stored as the head offset value between the first and second heads. Although the presently preferred method for determining head offsets has been disclosed above, a variety of means for determining head offsets have been disclosed in the prior art and are encompassed within the scope of the present invention. For example, see U.S. Pat. No. 5,956,201 issued Sep. 21, 1999 to Pham et al. and assigned to the assignee of the present invention.

Figure 10:
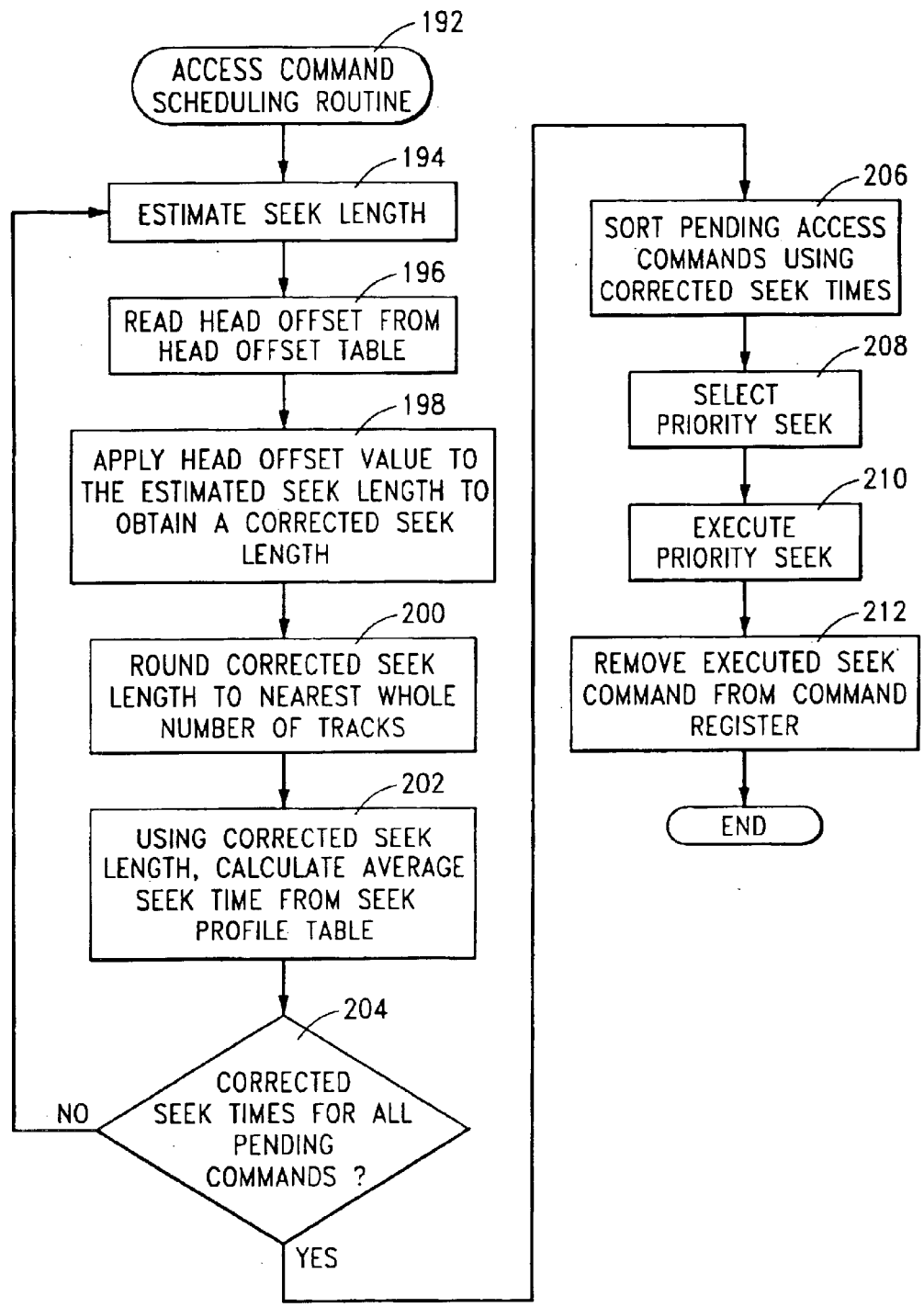
FIG. 10 is a flow chart for a ACCESS COMMAND SCHEDULING routine, illustrative of steps carried out by the control processor of FIG. 4 in accordance with preferred embodiments of the present invention.

Referring now to FIG. 10, shown therein is a flow chart for an ACCESS COMMAND SCHEDULING routine 192. It is contemplated that the routine 192 is performed as part of the command queue sorting strategy adopted by the disc drive 100 and used to evaluate each of a number of concurrently pending access commands in the command queue 162 (FIG. 4).

At step 194, the control processor calculates an estimated seek length 188 for a first selected pending access command. The estimated seek length 188 is calculated as the radial distance (in tracks) between the radial position of the currently active head 178 (FIG. 9) over the initial cylinder 180 and the destination cylinder 184. At step 196, the control processor 142 reads the head offset value corresponding to the head offset exhibited between the presently active head 178 and the target head 182 from the head offset table stored in the processor memory 144. At step 198, the control processor 142 applies the head offset value retrieved from the head offset table to the estimated seek length 188. At step 200, the sum of the head offset value and the estimated seek length 188 is rounded to the nearest whole track to produce a corrected seek length 190. It will be noted that if no head switch is necessary (i.e., the presently selected head and the target head are the same head), then head offset is zero and the corrected seek length 190 is the same as the estimated seek length 188.

At step 202, the corrected seek length 190 is used to retrieve an average seek time for the pending access command from the seek profile table. The routine 192 next passes to decision step 204 where the control processor 142 determines if corrected seek times have been determined for all pending seeks stored in the command queue 162. If uncorrected pending seeks remain, the flow of the routine 192 returns to step 194 where a next pending seek command is evaluated. Steps 194 through 202 are thus repeated until all pending access commands stored in the command queue 162 have been evaluated.

The routine 192 next passes to step 206 where the control processor 142 sorts pending access commands using the average seek times derived from corrected seek lengths. It will be understood that, while presently preferred sorting methodologies have been disclosed above, additional sorting schemes may be cooperatively employed with the methods disclosed by the present invention. These additional schemes include, for example, weighting the priority given to pending commands based on the order in which these commands are received by the command queue 162.

Once the sorting operation is concluded, a priority pending access command ("priority seek") is selected at step 208. At step 210, the priority access command is executed using the servo control circuit 138. Finally, at step 212, the executed access command is removed from the command queue 162. The ACCESS COMMAND SCHEDULING routine 192 is repeatedly applied to all pending access commands stored in the command queue 162.

In view of the foregoing, it will now be understood that the present invention is directed to an apparatus and method for transferring data between a disc drive and a host computer. In accordance with preferred embodiments, a disc drive (100) includes a rotatable disc (108) with a recording surface on which a plurality of concentric data tracks (133) are defined, each data track having a plurality of data sectors (134). A plurality of heads (118) are used to store data to and retrieve data from the data sectors. A servo circuit (138) performs seeks to move the head to positions adjacent selected tracks, each seek having an associated seek length distance with an average seek time. A control processor (140) controls the transfer of data between the disc and a host computer in response to an access command from the host computer.

The control processor calculates an estimated seek length as the radial distance between the an initial track and a destination track (step 194, FIG. 10). A positional offset value between each of the plurality of heads is measured and applied to the estimated seek length to calculate a corrected seek length (steps 198, 200). A corrected seek time is calculated from a seek profile table in relation to corrected seek length (step 202). The corrected seek time is used by the control processor to schedule the access commands stored in the command queue (step 206).

For purposes of the appended claims, the use of the term "over" will be understood consistent with the foregoing discussion to describe the relative placement of the associated head in a reading/writing relationship with the associated track, irrespective of the physical orientation of the track and head.

It will be clear that the present invention is well adapted to carry out the objects and attain the ends and advantages mentioned as well as those inherent therein. While presently preferred embodiments have been described for purposes of this disclosure, numerous changes may be made which will readily suggest themselves to those skilled in the art and which are encompassed in the spirit of the invention disclosed and as defined in the appended claims.

What is claimed is:

1. A method comprising steps of:
   (a) determining a radial positional offset between a presently active data transducer and a different, target data transducer, with respect to a present data cylinder operably associated with the presently active data transducer, adjacent corresponding data recording surfaces, said offset comprising a distance extending along a radius of said surfaces; and
   (b) using the determined radial positional offset distance to schedule a seek operation wherein the presently active data transducer is moved from an initial position and the target data transducer is moved to a final position.

2. The method of claim 1, in which the determining step (a) further comprises a step of storing the radial positional offset in a head offset table in memory accessible by a control processor.

3. The method of claim 1, in which the using step (b) comprises steps of identifying an initial seek distance comprising a radial distance between an initial track over which the presently selected data transducer is disposed and a destination cylinder having a destination track to which the target head is to be moved, and determining a corrected seek distance in relation to the initial seek distance and the radial positional offset.

4. The method of claim 1, further comprising a step of:
   (c) executing a seek to place the target data transducer to the final position adjacent a destination track.

5. The method of claim 4, in which the executing step (c) comprises steps of applying current to an actuator motor to move the presently active data transducer from an initial cylinder to a final cylinder while transducing servo data from the associated recording surface, and performing a head switch operation to switch to the target data transducer, wherein upon such head switch operation the target data transducer is nominally adjacent the destination track in a destination cylinder different from the final cylinder.

6. The method of claim 4, in which the executing step (c) comprises steps of performing a head switch operation to switch from the presently active data transducer to the target data transducer, and applying current to an actuator motor to move the target data transducer to the destination track in a destination cylinder while using the target data transducer to transducer servo data from the associated recording surface.

7. A method comprising:
   determining a radial offset distance between a first data transducer adjacent a first data storage cylinder and a second data transducer, with respect to the first data storage cylinder said distance extending between the transducers along a radius of the first data storage cylinder; and
   using the determined radial offset distance to schedule a seek operation from a plurality of operations for moving the second data transducer to a second data storage cylinder different than the first data storage cylinder.

8. The method of claim 7, wherein the using step comprises determining an estimated seek distance comprising a radial distance between the first cylinder comprising an initial track and the second cylinder comprising a destination track, and then adjusting the estimated seek distance in relation to the radial offset distance to obtain a corrected seek distance representative of the actual distance between the second head and the destination track.

9. The method of claim 8, wherein the using step further comprises determining a seek time from a seek profile table in relation to the corrected seek distance.

10. The method of claim 8, wherein the using step further comprises rounding the corrected seek distance to a whole number of tracks.

11. The method of claim 7, further comprising executing said seek operation in a queued command environment.

12. A data storage device comprising a control circuit which schedules a seek operation wherein a presently active data transducer is moved from an initial position adjacent a first media surface and a target data transducer is moved to a final position adjacent a second media surface, said scheduling based on a corrected seek time determined in relation to a radial positional offset distance between the presently active data transducer and the target data transducer, with respect to a present data cylinder operably associated with the presently active data transducer, as measured along a radius of said first and second media surfaces.

13. The data storage device of claim 12, wherein the control circuit determines the corrected seek time by identifying an initial seek distance along the radius of the first media surface between an initial cylinder comprising the initial position and a destination cylinder comprising the final position, and then determining a corrected seek distance in relation to the initial seek distance and the radial positional offset distance.

14. The data storage device of claim 12, wherein the control circuit further executes the seek operation to place the target data transducer at the final position adjacent a destination track in a destination cylinder.

15. The data storage device of claim 14, wherein the control circuit executes the seek by applying current to an actuator motor to move the presently active data transducer from an initial cylinder to a final cylinder while transducing servo data from the associated recording surface, and performing a head switch operation to switch to the target data transducer, wherein upon such head switch operation the target data transducer is nominally adjacent the destination track.

16. The data storage device of claim 14, wherein the control circuit executes the seek by performing a head switch operation to switch from the presently active data transducer to the target data transducer, and applying current to an actuator motor to move the target data transducer to the destination track while using the target data transducer to transducer servo data from the associated recording surface.

17. A data storage device, comprising:
   a plurality of heads adjacent a corresponding plurality of recording surfaces on which a plurality of concentric data tracks are respectively defined so that the tracks on the recording surfaces at each given radius make up a cylinder; and
   means for scheduling a plurality of pending access commands from a host computer to access a corresponding plurality of destination tracks on different recording surfaces each having an associated target head different from a presently active head, by determining a corrected seek time for each of the pending access commands which accounts for radial positional offset distance between the presently active head and the associated target head, with respect to a present data cylinder operably associated with the presently active head, along the respective recording surfaces.

18. The data storage device of claim 17, wherein the means for scheduling comprises a control processor which schedules the execution of the pending access commands in relation to the corrected seek time for each pending access command determined in relation to an estimated seek length as a radial distance between an initial cylinder over which the presently active head is located and a destination cylinder having a destination track corresponding to the associated access command, a radial positional offset value between the presently active head and the associated target head, and a table of estimated seek times by seek length.

* * * * *